(12) United States Patent
Seibertz et al.

(10) Patent No.: US 6,830,534 B2
(45) Date of Patent: Dec. 14, 2004

(54) METHOD FOR CONTROLLING THE INTERNAL COMBUSTION ENGINE OF A MOTOR VEHICLE WITH A STOP/START FUNCTION

(75) Inventors: Achim Seibertz, Aachen (DE); Engbert Spijker, Nuth (NL); Rainer Busch, Aachen (DE)

(73) Assignee: Ford Global Technologies, LLC, Deadborn, MI (US)

( * ) Notice: Subject to any disclaimer, the term of this patent is extended or adjusted under 35 U.S.C. 154(b) by 0 days.

(21) Appl. No.: 10/065,374

(22) Filed: Oct. 10, 2002

(65) Prior Publication Data

US 2003/0087724 A1 May 8, 2003

(30) Foreign Application Priority Data

Oct. 13, 2001 (EP) .............................................. 01124555

(51) Int. Cl.[7] .............................................. B60K 41/06
(52) U.S. Cl. .......................................................... 477/92
(58) Field of Search ........................ 477/92; 123/179.4; 701/112, 113, 213

(56) References Cited

U.S. PATENT DOCUMENTS

| | | | |
|---|---|---|---|
| 4,630,577 A | | 12/1986 | Cornacchia |
| 5,451,820 A | * | 9/1995 | Gotoh et al. ............. 123/179.4 |
| 5,566,072 A | * | 10/1996 | Momose et al. ............. 701/117 |
| 6,283,086 B1 | * | 9/2001 | Yamamoto et al. ...... 123/179.4 |
| 6,316,842 B1 | * | 11/2001 | Kuroda et al. ............. 290/40 C |
| 6,371,889 B1 | * | 4/2002 | Kuroda et al. ............. 477/181 |
| 6,401,012 B1 | * | 6/2002 | Aoki et al. ............. 123/179.4 |
| 6,532,926 B1 | * | 3/2003 | Kuroda et al. ............ 123/179.4 |

FOREIGN PATENT DOCUMENTS

| | | |
|---|---|---|
| DE | 19958520 A1 | 6/2001 |
| EP | 1028022 A2 | 8/2000 |
| EP | 1077149 A2 | 2/2001 |
| EP | 1077328 A1 | 2/2001 |
| FR | 2795770 | 1/2001 |

* cited by examiner

*Primary Examiner*—Sherry Estremsky

(57) ABSTRACT

The invention relates to a method for controlling an internal combustion engine, in which a normal state (A) is exited by switching off the engine (state B) if a standstill of the vehicle is detected (STOP_COND), and in which the engine is restarted when specific conditions (START_COND) apply. When a stop-and-go situation (SS_DISABLE) applies (state A'), this stop/start function is suppressed. Here, for example, repeated activation of the brakes, the engagement of specific gears and/or the spatial location of the motor vehicle may indicate that the vehicle is in a stop-and-go situation in which only brief, uneconomic switching off of the engine is probable.

21 Claims, 3 Drawing Sheets

METHOD FOR CONTROLLING THE INTERNAL COMBUSTION ENGINE OF A MOTOR VEHICLE WITH A STOP/START FUNCTION

BACKGROUND OF THE INVENTION

1. Field of the Invention

The invention relates to a method for controlling an internal combustion engine of a motor vehicle, the internal combustion engine capable of being automatically switched off depending on a vehicle state indicating that a standstill is detected. In addition, the invention relates to a controller (6) for the internal combustion engine of a motor vehicle which can carry out such a method.

2. Background of the Invention

It is known to equip motor vehicles with a stop/start function by automatically switching off the internal combustion engine when certain conditions apply. In particular, the internal combustion engine is switched off when idling, the vehicle is stationary, or has a low speed. The internal combustion engine is automatically started again based on a driver demand. The stop/start function to a saving in fuel by minimizing the amount of time spent idling the engine.

A stop/start function of the aforesaid type is described, for example, in DE 199 50 080 A1. Here, various specific conditions are tested to detect a state in which the vehicle is briefly stationary, for example before a traffic light.

So that the saving in fuel, as a result of the switching off of the internal combustion engine, exceeds the additional expenditure of fuel on restarting the internal combustion engine, the internal combustion engine must typically be switched off for more than about 20 seconds. However, this condition is not fulfilled in all cases in which automatic switching off of the internal combustion engine takes place in the known methods. For example, it may be uneconomic to switch off the internal combustion engine if the vehicle is in heavy traffic where the vehicle frequently comes to a brief standstill and starts up. Similarly, the motor vehicle comes to brief standstills during parking maneuvers, and often alternating between forward and reverse gears. A complicating factor is that customary speed sensors have a low level of accuracy so that low speeds of typically less than 3 km/h are detected as "standstill". The situations described with frequent alternation between a standstill and starting up (forward or backward) are referred to below as "stop-and-go situation".

The switching off of the engine in stop-and-go situations is not only uneconomic but it potentially gives the driver a disagreeable driving sensation. This applies even with modern starters, which require only a short time for a restart.

To prevent the internal combustion engine switching off too quickly, it is known to allow the internal combustion engine to continue running for a specific time, of typically 2 to 5 seconds, after the vehicle has been at a standstill before it is switched off. If the vehicle is thus made to move again within this short time, the intermediate switching off of the engine is suppressed. However, a disadvantage here is that uneconomic switching off still occurs in the case of relatively long standstills which are greater than 2 to 5 seconds, but still below the 20 second limit. In addition, the fuel savings during idle periods is reduced by the 2 to 5 seconds.

According to another known strategy, after the internal combustion engine has been repeatedly started a second time without the vehicle covering a distance in the meantime, the stop/start function is deactivated until a predefined threshold value of the vehicle velocity has been exceeded. A disadvantage here, however, is that the two starting operations, which are carried out in stop and go situations, are fuel consuming.

SUMMARY OF INVENTION

The method according to the invention for controlling the internal combustion engine of a motor vehicle includes a stop/start function according to which the internal combustion engine is automatically switched off if a vehicle state, which indicates a standstill of the vehicle is detected. The detection of a vehicle state which indicates a standstill can be carried out according to the methods or rules known in the prior art, that is to say for example by checking whether the vehicle velocity is (approximately) zero and the brake is activated. The method is characterized in that the automatic switching off of the internal combustion engine is suppressed if a stop-and-go situation is detected. The stop-and-go situation is, as explained above, defined here by repeated starting and stopping at brief intervals and by a high probability of such driving behavior.

The detection of a stop-and-go situation which can take place in a variety of ways described in detail below, makes it possible, during the presence of such a situation, to suppress automatic switching off of the engine. This has the advantage that uneconomic switching-off operations which typically last less than 20 seconds are avoided by a "predictive" regulating strategy. In addition, the driving behavior of the motor vehicle is improved particularly in the critical and demanding stop-and-go situations as in these situations the driver is provided with a rapid reaction of the drive system at all times. When starting the vehicle at intersections or traffic lights or when parking there is therefore no delay caused by renewed starting of the engine.

According to one specific implementation of the detection of a stop-and-go situation, its start is assumed if it is detected that the brake of the motor vehicle is activated repeatedly within brief intervals, and if the vehicle velocity when the brake is activated is below a predefined threshold value of typically 5 km/h. That is to say slow travel with frequent activation of the brake is assumed as an indication of a stop-and-go traffic situation. The assumption of a stop-and-go situation can preferably also require the condition that the accelerator pedal must have been activated between two activations of the brake. If the start of a stop-and-go situation has been detected, the engine controller (6) goes into a state in which the automatic switching off of the internal combustion engine (stop/start function) is deactivated.

The predefined brief time intervals within which the brake is to be activated in order to detect a stop-and-go situation are preferably in the range of less than two to twenty, preferably less than two to five seconds. It has become apparent that such intervals correctly detect the most frequent stop-and-go situations.

The threshold value of the vehicle velocity which must not be exceeded when the brake is activated for a stop-and-go situation to be assumed is typically between 2 and 10 km/h, particularly preferably between 4 and 8 km/h. Driving at such low speeds is characteristic of stop-and-go situations. In addition, such speeds can still be measured with sufficient accuracy with customary sensors.

The end of a stop-and-go situation which has been assumed owing to the presence of a certain condition is preferably assumed if a predefined time period has passed since the start of the stop-and-go situation. This time period is typically between 1 and 5 minutes.

Alternatively or additionally, the end of a stop-and-go situation can also be assumed if the vehicle velocity is above a predefined threshold value and the accelerator pedal is activated. Such a situation indicates that a fluid traffic situation prevails again so that the normal stop/start function can be activated again. In such a situation, the threshold value of the vehicle velocity is typically in the range from 2 to 10 km/h particularly preferably from 4 to 8 km/h already mentioned above.

The end of a stop-and-go situation can also be assumed if the brake is activated after a predefined time period since the start of the stop-and-go situation. In this case, there are indications that a genuine, relative long standstill of the vehicle has occurred so that the internal combustion engine is switched off automatically at the end of the stop-and-go situation.

According to another refinement of the detection of a stop-and-go situation, the current spatial and geographical position of the motor vehicle is determined and a stop-and-go situation is assumed if the motor vehicle is in a zone with stop-and-go traffic. The determination of the geographical position of the motor vehicle can be carried out, for example, using a navigation system and/or the global positioning system (GPS). In this approach, a stop-and-go situation is not inferred from the driving behavior but rather from the location of the motor vehicle. Said location is compared with other information, for example from a map, in order to determine whether the vehicle is in a region with stop-and-go traffic.

Here, a stop-and-go situation may be assumed, for example, if the vehicle is in the vicinity of highway intersections, expressway interchanges, traffic lights, pedestrian crossings, or the like, where only brief standstills occur. Such traffic zones, which are indicated on digital maps, can be automatically detected and the stop/start function can then be switched off in such areas. Furthermore a stop-and-go situation may also be assumed in sections of expressway in which there is backed-up traffic, on the basis of the current position of the vehicle, which is determined. Such backing up of traffic can be assumed, for example, if the section of expressway is chronically backed up. The method can, if appropriate, also carry out dynamic evaluation of information relating to backing up of traffic, which information is transmitted for example from a traffic control center.

According to a further refinement of the invention, the start of a stop-and-go situation is detected if the gear shift lever is in a predefined position. This can be the gear shift lever of a manual shift transmission or of an automatic transmission. The position of the gear shift lever generally supplies important information about the further intention of the driver so that this information can advantageously be utilized to monitor the stop/start function.

In particular, it is possible here to detect the start of a stop-and-go situation if the gear shift lever is in the reverse gear position and/or, in the case of an automatic transmission, in a position—for example reverse, neutral, L, M or parking—other than the normal drive position (drive D). The reverse gear position of the gear shift lever indicates that the driver is driving, or would like to drive, in reverse, which includes slow driving and generally maneuvering. In the case of such a driving mode it is undesirable if the engine is automatically switched off. The positions of the gear shift lever which differ from the normal drive position in an automatic transmission represent an indicator for a stop-and-go situation in which it is advantageous to switch off the stop/start function.

The invention also relates to a controller (6) of the internal combustion engine of a motor vehicle. Controller (6) contains a module for carrying out a stop/start function to switch off the internal combustion engine when a vehicle state which indicates a standstill is detected. In addition, controller (6) contains a module for detecting a stop-and-go situation, which is coupled to the stop/start module in such a way that it suppresses the stop/start function when a stop-and-go situation is present. The stop-and-go module is preferably connected here to a sensor for the pedal positions of the brake and, if appropriate accelerator pedal to be able to detect repeated activation of the brake (and if appropriate of the accelerator pedal) at brief intervals. In addition, the stop-and-go module is preferably connected to a sensor for the vehicle velocity. Furthermore, the module can receive a signal, which indicates the position of the gearshift lever.

In addition, the stop-and-go module can additionally be connected to a navigation system, which has, for example, a GPS receiver. From the comparison of the current vehicle position, determined with this system, the data of a stored digital map or a traffic control center, the module can then determine whether or not the vehicle is in a region which is particularly susceptible to stop-and-go traffic.

BRIEF DESCRIPTION OF DRAWINGS

The invention is explained in more detail below by way of example with reference to the figures, of which.

DETAILED DESCRIPTION

Figure 1:
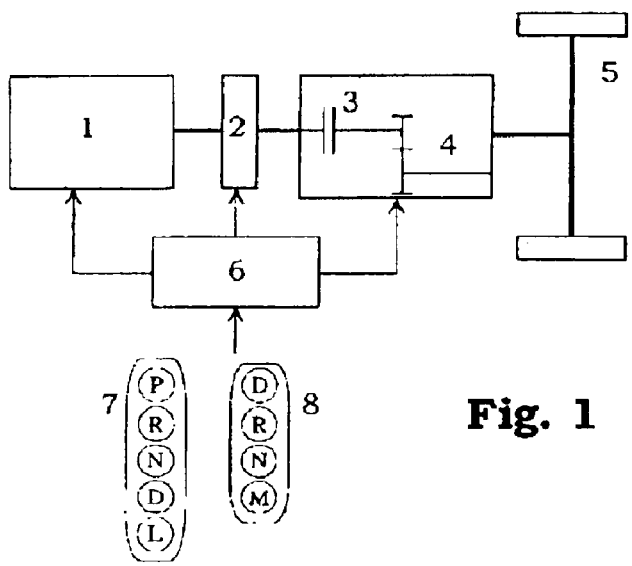
FIG. 1 is a schematic view of the drivetrain of a motor vehicle.

FIG. 1 is a schematic illustration of the drivetrain of a motor vehicle, which has an internal combustion engine 1, a starter 2, a clutch 3, a transmission 4, and wheel axle 5. The starter 2 is of a modern type, which can accelerate the internal combustion engine 1 from a standstill to the idling speed (typically 800 rpm) within several hundred milliseconds. Alternatively, starter 2 is a starter/generator (SG).

The starter can carry out a stop/start function. Here, internal combustion engine 1 is switched off when the vehicle is at a standstill, for example in front of a traffic light. When the vehicle is restarted, the engine can then be started again virtually without delay using starter 2. The switching off of internal combustion engine 1, by the stop/start function, is generally controlled on the basis of the measured vehicle velocity, v, and an activation of the brake. If the vehicle velocity, v, is (virtually) zero and the brake is activated, internal combustion engine 1 is switched off after a brief idling time of typically 3 s. Furthermore, other variables can also influence the stop/start function. For example a sufficiently high operating temperature of the internal combustion engine 1 can thus be used as a precondition for the internal combustion engine 1 being automatically switched off. A disadvantage with the known stop/start functions however is that they can switch off the internal combustion engine 1 in stop-and-go situations, for example in heavy, slow moving traffic or during a parking.

In addition, FIG. 1 illustrates two typical configurations 7 and 8 for the selection positions of the gear shift lever of an automatic transmission, the first configuration 7 having the positions P (parking), R (reverse), N (neutral), D (drive) and L (relatively low gears), and the second configuration 8 has the positions, D, R, N and M (manual).

Figure 2:
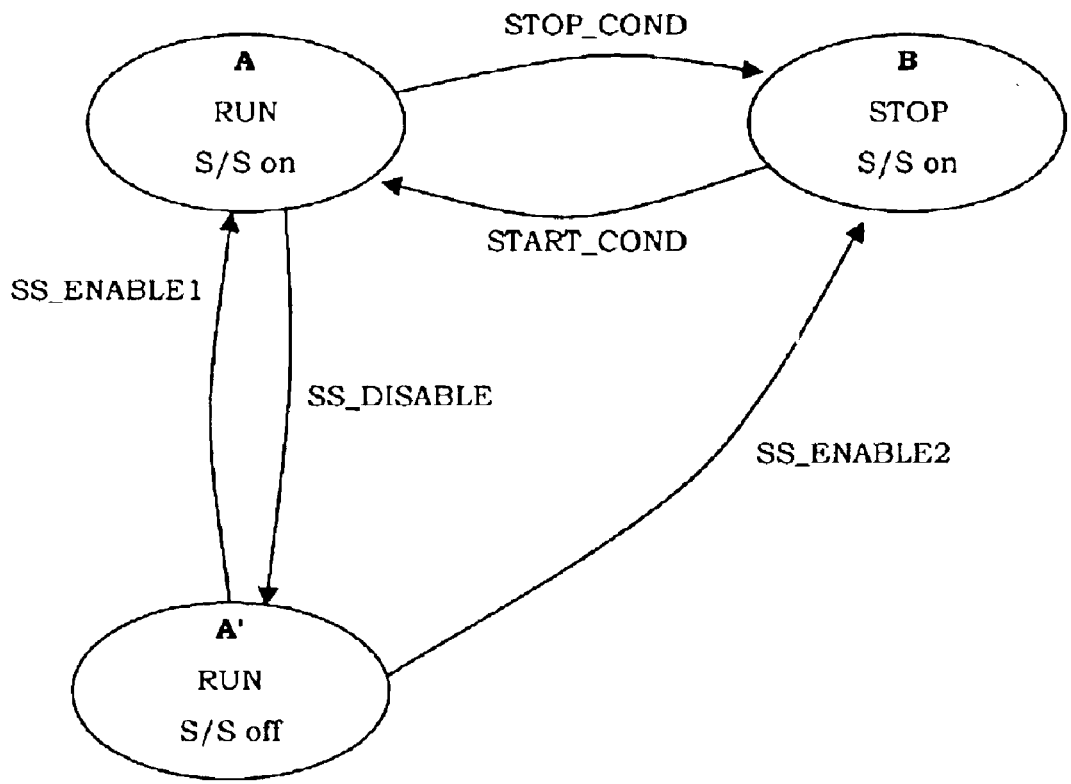
FIGS. 2–4 are state diagrams for engine stop/start control according to various aspects of the present invention.

FIG. 2 illustrates a first scheme for implementing a stop/start function, which is modified according to the invention and avoids the abovementioned disadvantages in stop-and-go situations.

While the internal combustion engine is operating normally, the engine controller is in state A ("RUN") in which the stop/start function is active ("S/S on"). Under the stop/start function, a change from state A to state B occurs when a corresponding stop condition, STOP_COND, is fulfilled. For example, vehicle velocity nearly zero and the brake activated constitutes a stop condition. In such an indication of a standstill of the vehicle, state B ("STOP") is assumed and the engine is switched off. Monitoring of the pedals continues when the stop/start function ("S/S on"). Control is passed back to A if a corresponding condition START_COND is fulfilled, for example if the brake is released or the accelerator pedal is activated.

In the method described above, which corresponds to the prior art, the engine may be switched off for intervals, which are less than 20 seconds long, which is undesirable. To avoid this problem in the prior art, a stop-and-go state A' is introduced according to the present invention, in which the switching off of the engine is suppressed ("S/S off"). Control is passed to stop-and-go state from the normal state A when a condition SS_DISABLE is fulfilled. This occurs, for example, when the brake is activated, released and reactivated within intervals of less than 3 seconds and the vehicle velocity is less than 5 km/h. Such driving behavior indicates a stop-and-go situation in which it would be inefficient to switch off the engine.

Control returns to normal state A from state A' when condition SS_ENABLE1 is fulfilled. This condition is, for example, a vehicle velocity greater than 5 km/h and an activated accelerator pedal. Alternatively, SS_ENABLE1 occurs when a predefined relatively long time interval has passed since the state A' was entered.

Continuing to refer to FIG. 2, stop-and-go state A' can jump to switch-off state B when SS_ENABLE2 is fulfilled. This condition is, for example, when the aforesaid relatively long time interval has passed since the start of the state A' and the brake is activated at the end of this time interval.

The conditions for the transitions in FIG. 2 are summarized in table form below:
[t1]

| Variable... | ... is TRUE if |
|---|---|
| STOP_COND | v = 0<br>AND<br>brake activated |
| START_COND | Brake released<br>OR<br>accelerator pedal activated |
| SS_DISABLE | Brake is released and re-activated within 5 sec<br>AND<br>v <= 5 km/h |
| SS_ENABLE1 | (v > 5 km/h AND accelerator pedal activated)<br>OR<br>waiting time terminated |
| SS_ENABLE2 | Brake activated<br>AND<br>waiting time terminated |

The parameters of the vehicle velocity v given in the table and the time periods are only to be understood by way of example and can be used or optimized in different ways depending on requirements. In addition, the stop-and-go state A' can also alternatively, or according to an additional criterion, be a function of the vehicle position. Here, it is possible, for example, for a global positioning system (GPS) to detect the position of the vehicle and initiate a transition into the state A' if the vehicle is in a region with stop-and-go traffic. The AND and OR herein, including the claims, refer to Boolean AND and OR operations.

Figure 3:
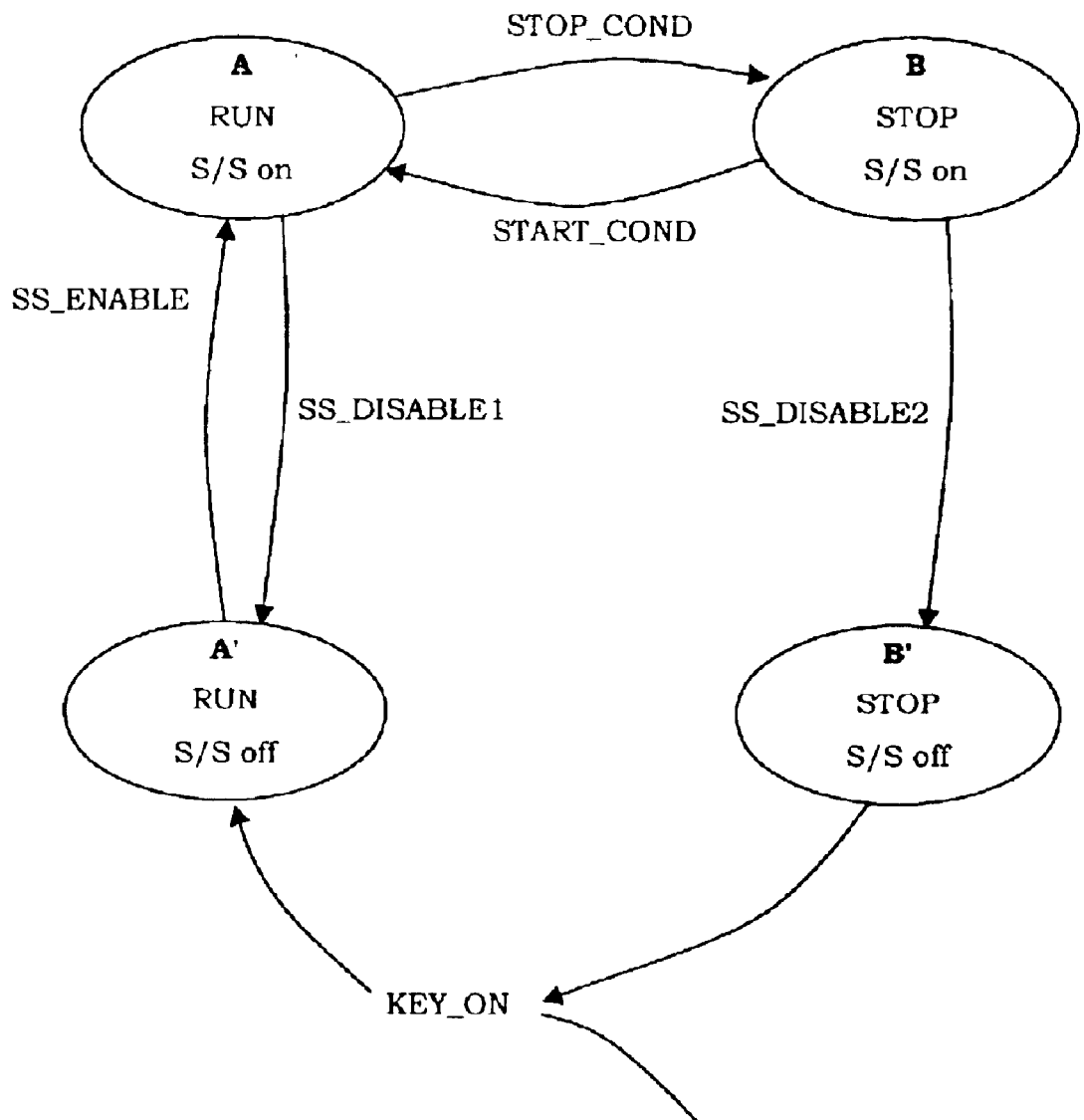

FIG. 3 shows a second alternative control scheme which is used in conjunction with an automatic transmission 7 according to FIG. 1. It is a characteristic of this scheme that the position of the gearshift lever is evaluated to detect a possible stop-and-go situation and the stop/start function is deactivated in response.

The significance of the states A, B and A' is the same as in FIG. 2. However, in contrast to FIG. 2, an additional state B' ("STOP") is present in which the motor has been switched off by the stop/start function, and at the same time the stop/start function is deactivated ("S/S off"). Control is passed to state B' from state B when the condition SS_DISABLE2 is fulfilled. State B' is exited when the ignition key is activated ("KEY_ON"). After such activation of the ignition key, the engine controller (6) continues in state A'.

The conditions for the transitions in FIG. 3 are summarized in table form below:
[t2]

| Variable... | ... is TRUE if |
|---|---|
| STOP_COND | v = 0<br>AND<br>brake activated |
| START_COND | Brake released<br>OR<br>accelerator pedal activated<br>OR<br>gearshift lever in position R or L |
| SS_DISABLE1 | Gearshift lever in position R or L |
| SS_DISABLE2 | Gearshift lever in position P |
| SS_ENABLE | Gearshift lever in position D or N |

The conditions for STOP_COND or START_COND which are given in the table and the parameters of the vehicle velocity, v, and the time periods are to be understood only by way of example and can be used and optimized in different ways depending on requirements.

Figure 4:
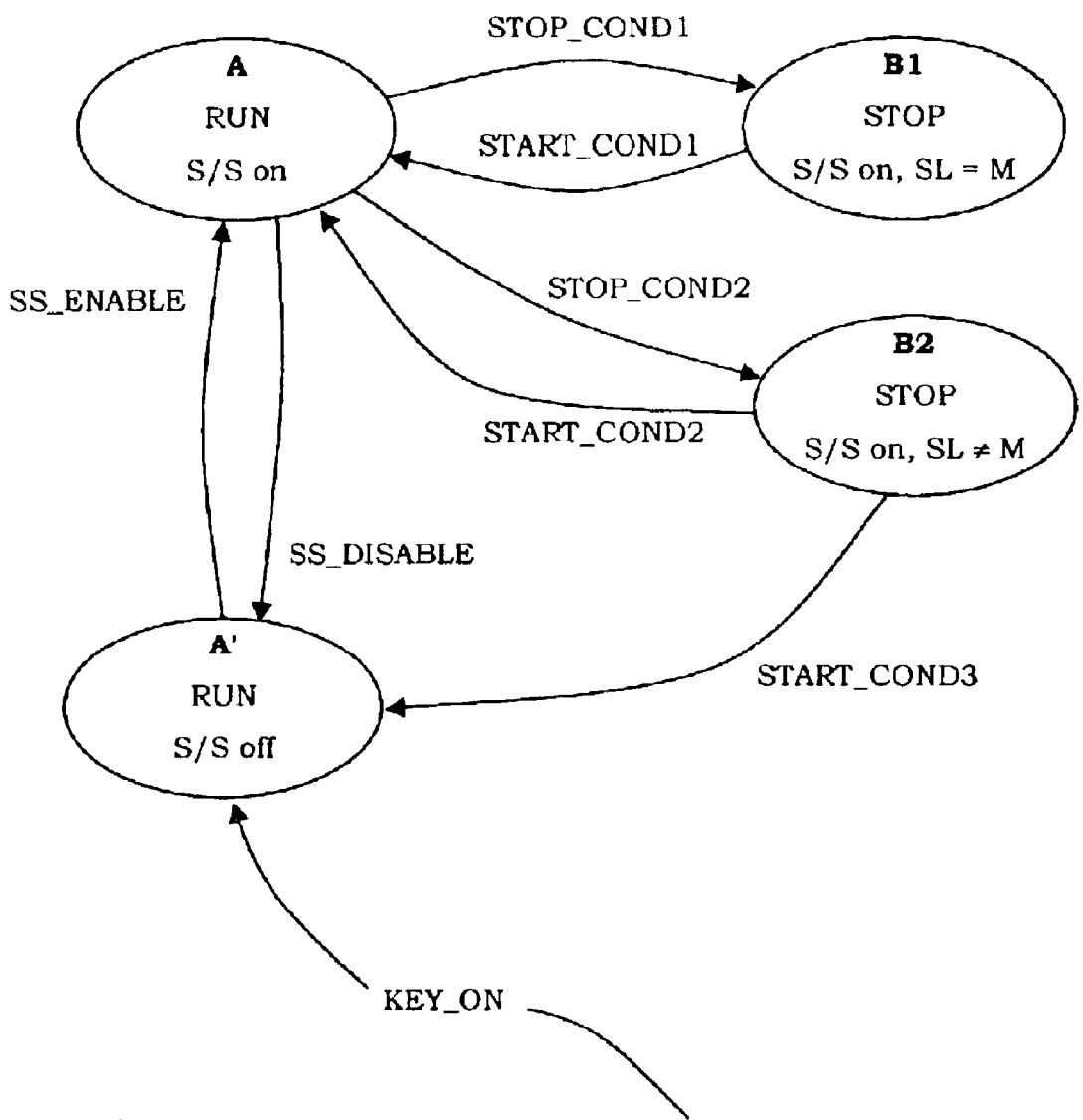

FIG. 4 shows a third alternative regulating scheme which is used in conjunction with an automatic transmission 8 according to FIG. 1. In this scheme, the position of the gearshift lever is evaluated to detect a possible stop-and-go situation and deactivate the stop/start function in response, i.e., state A', as also shown in FIGS. 2 and 3 and described in regards to FIGS. 2 and 3.

The significance of the states A, A' and KEY_ON is the same as in FIGS. 2 and 3. However, in contrast to the preceding figures, the state with the engine switched off by the stop/start function ("STOP") is divided up into two stages B1 and B2, depending on whether the gear shift lever is in the position M (B1) or not (B2). From the last mentioned state B2, it is possible to jump to state A' (engine on, stop/start function off) when condition START_COND3 is fulfilled.

The conditions for the transitions in FIG. 4 are summarized below in table form:
[t3]

| Variable ... | ... is TRUE if |
|---|---|
| STOP_COND1 | v = 0 |
| | AND |
| | brake activated |
| | AND |
| | gearshift lever in position M (not R) |
| STOP_COND2 | v = 0 |
| | AND |
| | brake activated |
| | AND |
| | gearshift lever not in position M or R |
| START_COND1 | Brake released |
| | OR |
| | accelerator pedal activated |
| START_COND2 | (Brake released |
| | OR |
| | accelerator pedal activated) |
| | AND |
| | gearshift lever not in position M or R |
| START_COND3 | Gearshift lever in position M or R |
| SS_DISABLE | Gearshift lever in position R |
| SS_ENABLE | Gearshift lever in position D or N or M |
| | AND |
| | v > threshold value, for example 5 km/h |

The conditions and parameters given in the table are again only to be understood by way of example and can be used and optimized in different ways depending on requirements.

Accordingly, it is characteristic for the method according to FIG. 4 that the stop/start function is switched off (state A') when reverse gear, R; is engaged when the engine is running or switched off, or M gear is engaged when the engine is switched off.

What is claimed is:

1. A method for controlling an on/off state of an internal combustion engine disposed in a motor vehicle, the running internal combustion engine capable of being automatically switched off, comprising: suppressing said capability of automatically switching off in response to detection of a stop-and-go situation; and wherein said stop-and-go situation is detected when a vehicle brake is released and reactivated within a predetermined time and a velocity of the vehicle is less than a predetermined speed.

2. The method of claim 1 wherein said time is 5 sec.

3. The method of claim 1 wherein said predetermined speed is 5 km/hr.

4. A method for controlling an on/off state of an in internal combustion engine disposed in a motor vehicle, the running internal combustion engine capable of being automatically switched off, comprising: suppressing said capability of automatically switching off in response to detection of a stop-and-go situation; and further comprising: discontinuing said suppression of said switching off when a vehicle speed is greater than a predetermined speed and an accelerator pedal is activated.

5. A method for controlling an on/off state of an internal combustion engine disposed in a motor vehicle, the running internal combustion engine capable of being automatically switched off, comprising: suppressing said capability of automatically switching off in response to detection of a stop-and-go situation; and, further comprising: switching off the engine automatically when said automatic switching is suppressed and a vehicle brake is activated and a predetermined waiting time has elapsed.

6. The method recited in claim 5 wherein said waiting time is approximately 5 seconds.

7. A method for controlling an on/off state of an internal combustion engine disposed in a motor vehicle, the running internal combustion engine capable of being automatically switched off, comprising: suppressing said capability of automatically switching off in response to detection of a stop-and-go situation; and wherein said stop-and-go situation is detected when a reverse (R) or low (L) gear of an automatic transmission is selected, said automatic transmission being coupled to engine.

8. The method of claim 7, further comprising: discontinuing said suppression of said switching off when a drive (D) or neutral (N) gear of said automatic transmission is selected.

9. A method for controlling an on/off state of an internal combustion engine disposed in a motor vehicle, the running internal combustion engine capable of being automatically switched off, the engine having an automatic transmission, comprising:

switching off the engine automatically when a velocity of said vehicle is substantially zero and a vehicle brake is activated; and suppressing said capability of automatically switching off when a park (P) gear of said the automatic transmission is selected.

10. A method for controlling an on/off state of an internal combustion engine disposed in a motor vehicle, the running internal combustion engine capable of being automatically switched off, the engine having an automatic transmission, the automatic transmission having a gearshift lever capable of accessing positions drive (D), reverse (R), neutral (N), and manual (M), comprising: switching off the engine automatically when a velocity of said vehicle is substantially zero and a vehicle brake is activated and the manual (M) position of the automatic transmission is selected.

11. The method of claim 10 further comprising starting the engine automatically when said vehicle brake is released.

12. The method of claim 10, further comprising starting the engine automatically when an accelerator pedal is activated.

13. A method for controlling an on/off state of an internal combustion engine disposed in a motor vehicle, the running internal combustion engine capable of being automatically switched off, the engine having an automatic transmission, the automatic transmission having a gearshift lever capable of accessing positions drive (D), reverse (R), neutral (N), and manual (M), comprising: switching off the engine automatically when a velocity of said vehicle is substantially zero and a vehicle brake is activated and the drive (D) position of the automatic transmission is selected, further comprising:

starting the engine automatically when the manual (M) or reverse (R) position of the automatic transmission is selected; and suppressing the capability of switching off automatically in response to said starting.

14. A method for controlling an on/off state of an internal combustion engine disposed in a motor vehicle, the running internal combustion engine capable of being automatically switched off, the engine having an automatic transmission, the automatic transmission having a gearshift lever capable of accessing positions drive (D), reverse (R), neutral (N), and manual (M), comprising: switching off the engine automatically when a velocity of said vehicle is substantially zero and a vehicle brake is activated and the drive (D) position of the automatic transmission is selected, and further comprising switching off the engine automatically when a velocity of said vehicle is substantially zero and a vehicle brake is activated and the neutral (N) position of the automatic transmission is selected; and further comprising:

starting the engine automatically when the manual (M) or reverse (R) position of the automatic transmission is selected; and suppressing the capability of switching off automatically in response to said starting.

15. A method for controlling an on/off state of an internal combustion engine disposed in a motor vehicle, the running internal combustion engine capable of being automatically switched off, the engine having an automatic transmission, the automatic transmission having a gearshift lever capable of accessing positions drive (D), reverse (R), neutral (N), and manual (M), comprising: suppressing the capability of switching off automatically when the reverse (R) position of the automatic transmission is selected.

16. The method of claim 15, further comprising discontinuing said suppression of the switching off when a velocity of the vehicle is greater than a predetermined velocity and the reverse (R) position of the automatic transmission is deselected.

17. The method of claim 16 wherein said predetermined velocity is 5 km/hr.

18. A computer readable storage media having stored therein data representing instructions executable by a computer to control an internal combustion engine disposed in a motor vehicle, the running internal combustion engine capable of being automatically switched off, the storage media comprising:

instructions to suppress said capability of automatically switching off in response to detection of a stop-and-go situation; and wherein said stop-and-go situation is detected when a vehicle brake is released and reactivated within a predetermined time and a velocity of the vehicle is less than a predetermined speed.

19. A computer readable storage media having stored therein data representing instructions executable by a computer to control an internal combustion engine disposed in a motor vehicle, the running internal combustion engine capable of being automatically switched off, the storage media comprising:

instructions to suppress said capability of automatically switching off in response to detection of a stop-and-go situation; and, further comprising instructions to discontinue said suppression of said switching off when a predetermined waiting time has elapsed.

20. A computer readable storage media having stored therein data representing instructions executable by a computer to control an internal combustion engine disposed in a motor vehicle, the running internal combustion engine capable of being automatically switched off, the storage media comprising:

instructions to suppress said capability of automatically switching off in response to detection of a stop-and-go situation; and, further comprising instructions to switch off the engine automatically when said automatic switching is suppressed and a vehicle brake is activated a predetermined waiting time has elapsed.

21. A computer readable storage media having stored therein data representing instructions executable by a computer to control an internal combustion engine disposed in a motor vehicle, the running internal combustion engine capable of being automatically switched off, the storage media comprising:

instructions to suppress said capability of automatically switching off in response to detection of stop-and-go situation; and, wherein said stop-and-go situation is detected when a reverse (R) or low (L) gear of an automatic transmission is selected, said automatic transmission being coupled to the engine.

* * * * *